United States Patent
Nakamori (10) Patent No.: US 9,300,198 B2
(45) Date of Patent: Mar. 29, 2016

(54) SEMICONDUCTOR DEVICE, INCLUDING TEMPERATURE SENSING CIRCUT

(71) Applicant: FUJI ELECTRIC CO., LTD., Kawasaki-shi (JP)

(72) Inventor: Akira Nakamori, Matsumoto (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 22 days.

(21) Appl. No.: 13/782,177

(22) Filed: Mar. 1, 2013

(65) Prior Publication Data

US 2013/0229840 A1 Sep. 5, 2013

(30) Foreign Application Priority Data

Mar. 5, 2012 (JP) ................................. 2012-047677

(51) Int. Cl.
*H02M 1/32* (2007.01)

(52) U.S. Cl.
CPC .......... *H02M 1/32* (2013.01); *H02M 2001/327* (2013.01)

(58) Field of Classification Search
CPC .. H02M 1/32; H02M 1/084; H02M 2001/327
USPC ................. 363/50, 56.03–56.12, 60
See application file for complete search history.

(56) References Cited

U.S. PATENT DOCUMENTS

| | | | | |
|---|---|---|---|---|
| 5,073,838 A * | 12/1991 | Ames | ............................. | 361/103 |
| 6,222,355 B1 * | 4/2001 | Ohshima et al. | .............. | 323/282 |
| 6,269,011 B1 * | 7/2001 | Ohshima | ........................ | 363/50 |
| 7,859,210 B2 * | 12/2010 | Sakurai et al. | ........... | 318/400.26 |
| 8,040,081 B2 * | 10/2011 | Shimana | .......................... | 318/34 |
| 2005/0264971 A1 * | 12/2005 | Morino | ........................ | 361/103 |
| 2006/0120002 A1 * | 6/2006 | Asada | ........................... | 361/103 |
| 2006/0289461 A1 * | 12/2006 | Kojima et al. | ................ | 219/497 |
| 2007/0274104 A1 * | 11/2007 | Furukoshi et al. | .............. | 363/16 |
| 2008/0100978 A1 * | 5/2008 | Maebara et al. | ............. | 361/93.8 |
| 2008/0192391 A1 * | 8/2008 | Inoue | ............................. | 361/18 |
| 2008/0192398 A1 * | 8/2008 | Inoue | ........................... | 361/103 |
| 2008/0224643 A1 * | 9/2008 | Sakurai et al. | ................ | 318/471 |
| 2009/0027928 A1 * | 1/2009 | Dong et al. | ..................... | 363/50 |

(Continued)

FOREIGN PATENT DOCUMENTS

| JP | 11-142254 A | 5/1999 |
|---|---|---|
| JP | 11258065 A | 9/1999 |

(Continued)

OTHER PUBLICATIONS

Japanese Office Action issued in counterpart application No. JP2012-047677, dated Dec. 15, 2015 English translation provided.

*Primary Examiner* — Timothy J Dole
*Assistant Examiner* — Yusef Ahmed
(74) *Attorney, Agent, or Firm* — Rossi, Kimms & McDowell LLP (57) ABSTRACT

A semiconductor device of the present invention determines an overheat state by comparing a forward voltage drop of a temperature sensing diode with a reference voltage, and in addition includes a series regulator circuit composed of an amplifier and resistors, that receives the forward voltage drop of a temperature sensing diode and delivers an output voltage as temperature information to an external output terminal for temperature detection of the semiconductor device. Such a device can continuously detect the temperature of the semiconductor chip.

8 Claims, 8 Drawing Sheets

(56) References Cited

U.S. PATENT DOCUMENTS

| | | | |
|---|---|---|---|
| 2009/0051307 A1* | 2/2009 | Katsuyama et al. | 318/472 |
| 2009/0206788 A1* | 8/2009 | Ando | 318/696 |
| 2009/0230949 A1* | 9/2009 | Moriya et al. | 324/120 |
| 2010/0102796 A1* | 4/2010 | Moriya et al. | 324/120 |
| 2010/0102797 A1* | 4/2010 | Moriya et al. | 324/120 |
| 2011/0058297 A1* | 3/2011 | Higashida et al. | 361/93.9 |
| 2011/0317315 A1 | 12/2011 | Motohashi et al. | |
| 2012/0219033 A1* | 8/2012 | Tanimura et al. | 374/1 |

FOREIGN PATENT DOCUMENTS

| | | |
|---|---|---|
| JP | 2007-071796 A | 3/2007 |
| JP | 2007195343 A | 8/2007 |
| JP | 2010-199490 A | 9/2010 |
| JP | 2012-010544 A | 1/2012 |

\* cited by examiner

SEMICONDUCTOR DEVICE, INCLUDING TEMPERATURE SENSING CIRCUT

CROSS-REFERENCE TO RELATED APPLICATION

This application is based on, and claims priority to, Japanese Patent Application No. 2012-047677, filed on Mar. 5, 2012, contents of which are incorporated herein by reference.

BACKGROUND OF THE INVENTION

1. Field of the Invention

The present invention relates to a semiconductor device to be applied to DC to DC conversion circuits, DC to AC conversion circuits, AC to DC conversion circuits, and AC to AC conversion circuits, and in particular, to a technology to deliver estimated temperature to an external output terminal.

2. Description of the Related Art

Figure 7:
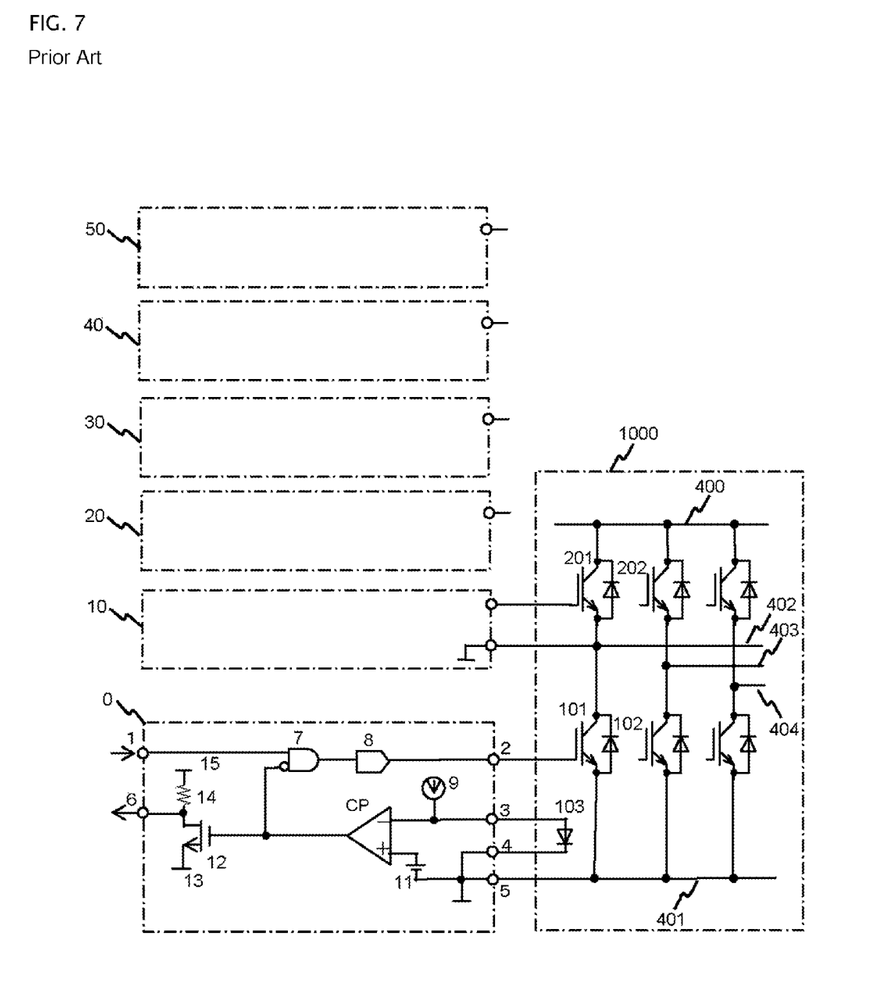
FIG. 7 is a circuit diagram of a conventional semiconductor device.

FIG. 7 shows an example of a circuit construction of a device for DC to AC conversion or AC to DC conversion including a temperature sensing circuit and an overheat protection circuit using a conventional technology disclosed in Patent Document 1. A main circuit 1000 comprises six IGBT chips and six diode chips arranged between a high voltage positive (P) bus 400 and a negative (N) or ground bus 401. IGBTs 101 and 201 and diodes 102 and 202, which are anti-parallel connected to the IGBTs, are given the reference numerals as such; other IGBTs and diodes are given no reference numerals.

AC lines 402, 403, and 404 are connected to AC terminals that are either AC output terminals for a DC to AC conversion circuit or AC input terminals for an AC to DC conversion circuit. The gate terminal of each IGBT chip is connected to one of driver ICs 0, 10, 20, 30, 40, and 50 for driving the IGBTs. Semiconductor devices having this construction are called intelligent power modules (IPMs). Each IGBT chip is provided with a temperature sensing diode mounted thereon, and the anode and the cathode of the temperature sensing diode are connected to the driver IC. The driver ICs 10 through 50 have the same circuit constructions as that of the driver IC 0 shown in FIG. 7 and so, the constructions are not shown in the figure.

The following describes the driver IC 0. When an ON signal at a high level is given to a terminal 1, the IGBT 101 turns ON increasing the current therein and the temperature thereof. The IPM has an overheat protection circuit therein. A comparator CP in the driver IC 0 compares a forward voltage drop across the temperature sensing diode 103 with a predetermined reference voltage 11. When the voltage across the temperature sensing diode 103 decreases below the reference voltage 11, the comparator delivers an output signal at a high level. This signal blocks the ON-driving signal at a high level given through the terminal 1 at an AND gate 7. The electric potential at the terminal 2 becomes through a pre-driver circuit 8 to the ground potential to turn OFF the IGBT 101. The output signal of the comparator CP makes a switching element 12, an NMOS, turn ON to make the terminal 6 at the ground potential. During the overheat protection circuit is out of operation, the output signal of the comparator CP is at a low level, a ground potential, and so, the switching element 12 is in an OFF state and a reference voltage 15 is given to the terminal 6.

Figure 8:
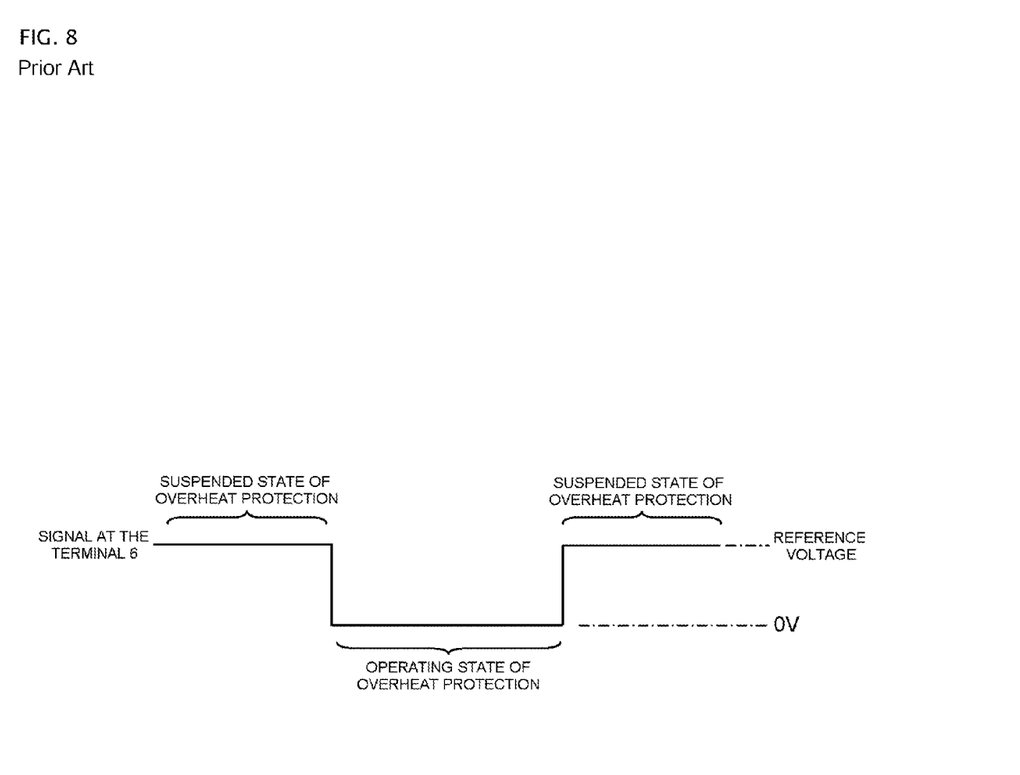
FIG. 8 shows a voltage signal at a temperature output terminal in the conventional semiconductor device.

The temperature sensing diode 103 performs a characteristic of a forward voltage drop versus temperature, as disclosed in Patent Document 2, that the forward voltage drop decreases with increase in temperature, which is a negative dependence on temperature. FIG. 8 shows behavior of the signal at the terminal 6. It is shown that the voltage at the terminal 6 is the voltage of the reference voltage 15 in a suspended state of the overheat protection operation, and is the ground potential at zero volts in an operating state of the overheat protection.

[Patent Document 1]
Japanese Unexamined Patent Application Publication No. H11-142254

[Patent Document 2]
Japanese Unexamined Patent Application Publication No. 2010-199490

As described above, the temperature information that is the voltage signal delivered from the terminal 6 is a binary signal that is the reference voltage 15 when the temperature of the IGBT is lower than a predetermined value and that is the ground potential when the temperature of the IGBT is higher than the predetermined value, which corresponds to the voltage across the temperature sensing diode 103 lower than the reference voltage 11. As a consequence, the conventional device cannot always watch the temperature of the IGBT in operation.

SUMMARY OF THE INVENTION

It is therefore an object of the present invention to provide a semiconductor device, which can be an IPM, allowing watching always the temperature of semiconductor switches such as IGBTs.

To accomplish the above object, a first aspect of the present invention is a semiconductor device for a power conversion circuit comprising: a semiconductor switch; a diode antiparallel connected to the semiconductor switch; and a driver IC including: a temperature sensing diode that is disposed in a chip of the semiconductor switch; a current source that supplies constant current to the temperature sensing diode; an overheat protection circuit that turns the semiconductor switch OFF when a forward voltage drop of the temperature sensing diode reaches a predetermined value; and a series regulator that receives the forward voltage drop of the temperature sensing diode; wherein an output signal of the series regulator is delivered to an external output terminal for temperature detection of the semiconductor device.

A second aspect of the present invention is a semiconductor device for a power conversion circuit comprising: a semiconductor switch; a diode antiparallel connected to the semiconductor switch; and a driver IC including: a temperature sensing diode that is disposed in a chip of the semiconductor switch; a current source that supplies constant current to the temperature sensing diode; an overheat protection circuit that turns the semiconductor switch OFF when a forward voltage drop of the temperature sensing diode reaches a predetermined value; and a series regulator that receives the forward voltage drop of the temperature sensing diode; and a switching circuit that turns ON with operation of the overheat protection circuit; wherein an output signal of the series regulator is delivered to the switching circuit, and the switching circuit delivers a ground potential of a power supply of the driver IC when the switching circuit is in an ON state and the switching circuit delivers the output voltage of the series regulator when the switching circuit is in an OFF state to an external output terminal for temperature detection of the semiconductor device.

A third aspect of the present invention is the semiconductor device for a power conversion circuit according to the first or second aspect of the invention, wherein the overheat protection circuit turns the semiconductor switch OFF when the output voltage of the series regulator reaches a predetermined value.

A fourth aspect of the present invention is the semiconductor device for a power conversion circuit according to any one of the first through third aspects of the invention, wherein the semiconductor switch is an insulated gate type semiconductor element.

In a semiconductor device of the invention, a forward voltage drop across a temperature sensing diode is given to a series regulator, which in turn delivers an output signal thereof to an external output terminal of the semiconductor device. Therefore, the temperature of the semiconductor switch can be always watched.

DETAILED DESCRIPTION OF THE INVENTION

The essential point of the present invention is that semiconductor chips of the semiconductor device that is an IPM are each provided with a temperature sensing diode and a forward voltage drop of this diode is compared with a reference voltage to perform overheat protection and simultaneously the forward voltage drop of the diode is given to a series regulator, output of which is delivered to an external output terminal for temperature detection.

Figure 1:
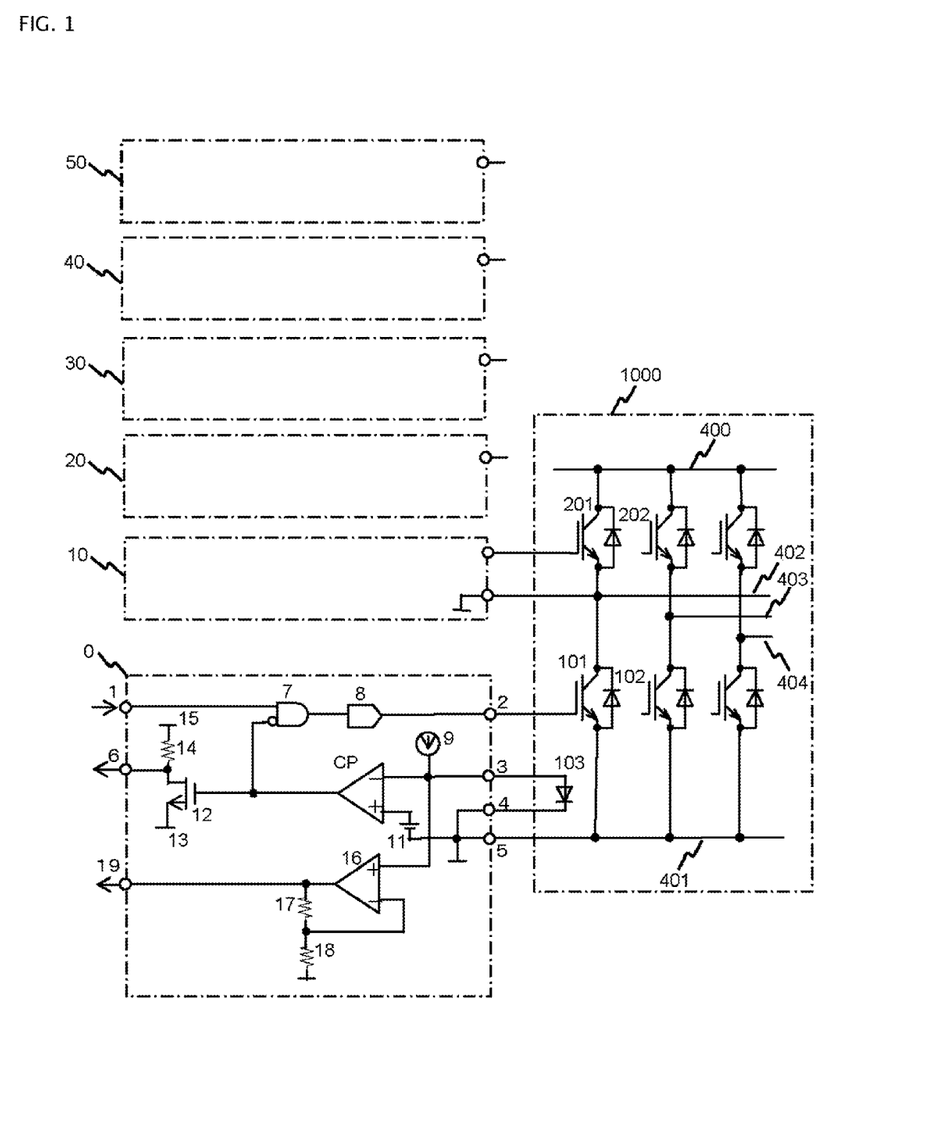
FIG. 1 is a circuit diagram showing a semiconductor device according to a first embodiment of the present invention.

FIG. 1 shows a circuit of a semiconductor device according to a first embodiment of the present invention. This circuit construction is a semiconductor device, an IPM, for DC to AC conversion or AC to DC conversion. A main circuit 1000 comprises six IGBT chips and six diode chips arranged between a high voltage positive (P) bus 400 and a negative (N) or ground bus 401. IGBTs 101 and 201 and diodes 102 and 202, which are anti-parallel connected to the IGBTs, are given the reference numeral as such; other IGBTs and diodes are given no reference numerals.

AC lines 402, 403, and 404 are connected to AC terminals that are either AC output terminals for a DC to AC conversion circuit or AC input terminals for an AC to DC converter circuit. The gate terminal of each IGBT chip is connected to one of driver ICs 0, 10, 20, 30, 40, and 50 for driving the IGBTs. Each IGBT chips is provided with a temperature sensing diode, although solely a temperature sensing diode 103 provided for the IGBT 101 is depicted in the figure. The diode 103 is supplied with a constant current by a current source 9. The anode and cathode terminals of the diode 103 are connected to a driver IC 0. The driver ICs other than the driver IC 0 have the same construction as the driver IC 0, and thus, internal circuit construction is not depicted in the figure.

The following describes the driver IC 0. When an ON signal at a high level is given to a terminal 1, the IGBT 101 turns ON increasing the current therein and the temperature thereof. The driver IC 0 includes an overheat protection circuit therein. A comparator CP in the driver IC 0 compares a forward voltage drop across the temperature sensing diode 103 with a predetermined reference voltage 11. When the voltage across the temperature sensing diode 103 decreases below the reference voltage 11 with increase in the temperature of the diode 103, the comparator delivers an output signal at a high level. This signal blocks the ON-driving signal at a high level given through the terminal 1 at an AND gate 7. The electric potential at the terminal 2 becomes through a predriver circuit 8 to the ground potential to turn OFF the IGBT 101. The output signal of the comparator CP makes a switching element 12, an NMOS, turn ON to change the potential at the terminal 6 to the ground potential.

Figure 2:
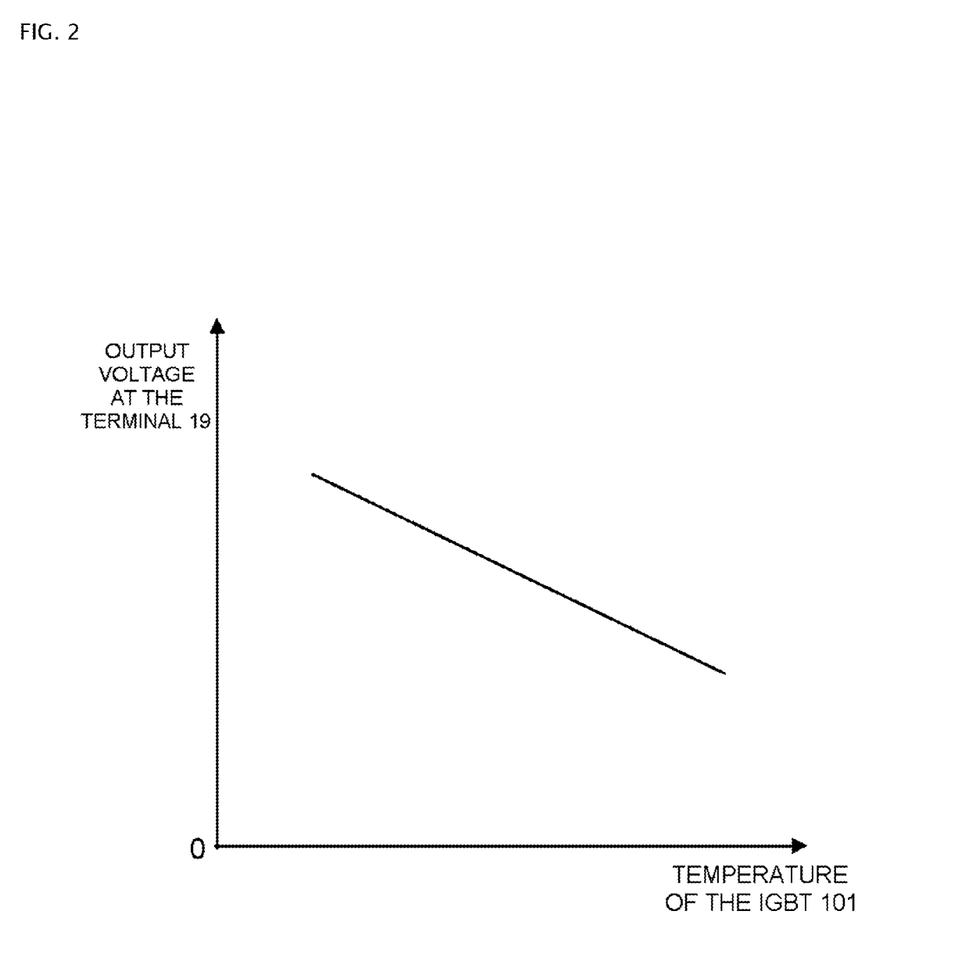
FIG. 2 shows a relationship between the temperature of the IGBT and the output voltage of the temperature sensing diode in the first embodiment.

During the overheat protection circuit is out of operation, the output signal of the comparator CP is at a low level, a ground potential, and so, the switching element 12 is in an OFF state and a reference voltage 15 is given to the terminal 6. The temperature sensing diode 103 performs a characteristic of a forward voltage drop versus temperature that the forward voltage drop decreases with increase in temperature, which is a negative dependence on temperature. The forward voltage drop across the temperature sensing diode 103 is also delivered to a series regulator composed of an amplifier 16 and resistors 17 and 18, and amplified by the series regulator circuit and delivered to an external output terminal 19 for temperature detection. The series regulator circuit amplifies the voltage across the temperature sensing diode 103 at a voltage lower than 1 volt up to several volts at the external output terminal 19 for temperature detection, thereby improving noise immunity in external utilization and raising detection accuracy. FIG. 2 shows a relationship between the temperature of the IGBT 101 and the voltage at the external output terminal 19 for temperature detection. Since the voltage follows the temperature variation, the IGBT temperature can be obtained every time including in the normal state.

[Second Embodiment]

Figure 3:
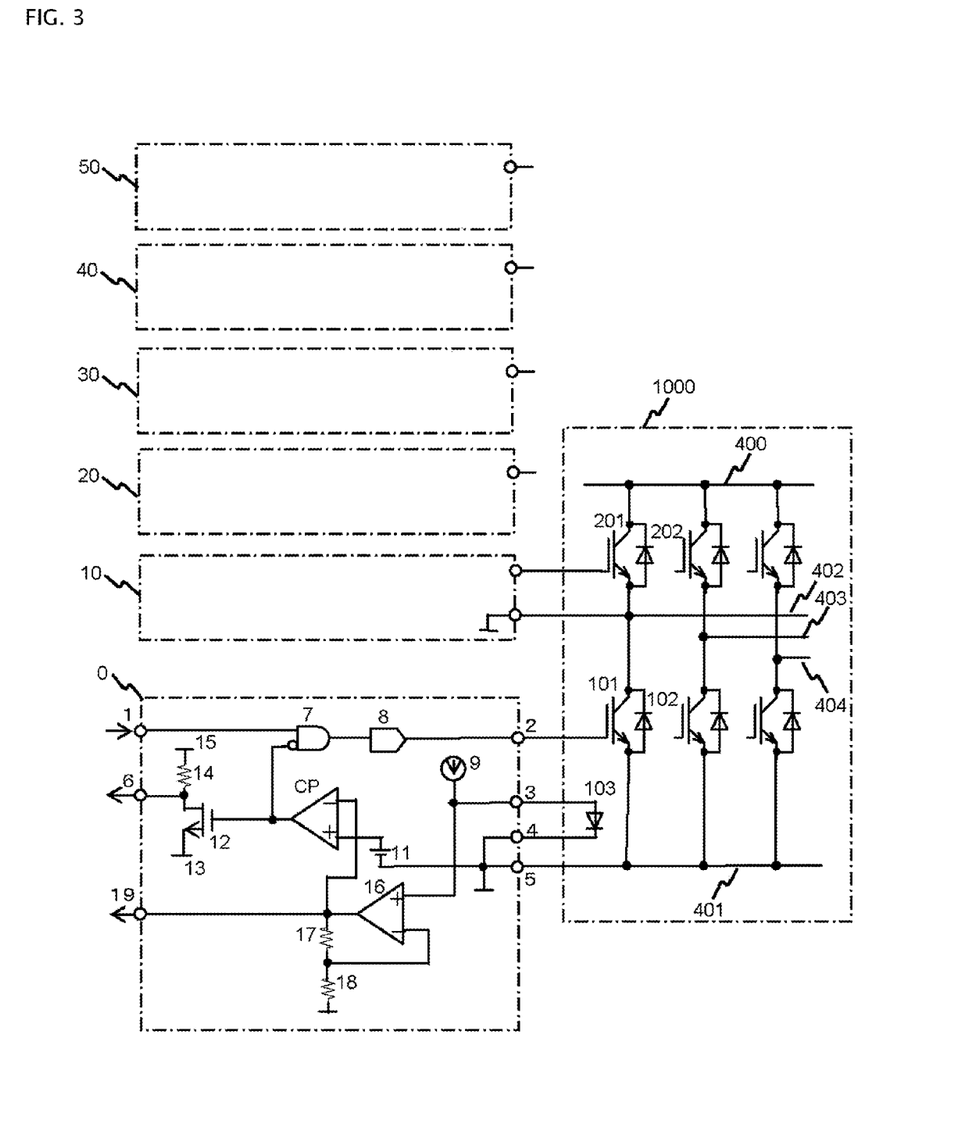
FIG. 3 is a circuit diagram showing a semiconductor device according to a second embodiment of the present invention.

FIG. 3 is a circuit diagram showing a semiconductor device according to a second embodiment of the present invention. The semiconductor device of the second embodiment differs from that of the first embodiment in that while the device of the first embodiment performs overheat protection by comparing directly the voltage across the temperature sensing diode 103 with the reference voltage 11 in the comparator CP, the device of the second embodiment performs overheat protection by comparing the output of a series regulator circuit composed of an amplifier 16 and resistors 17 and 18 with the reference voltage 11 in the comparator CP. The output of the series regulator is a voltage obtained by amplifying the voltage across the temperature sensing diode 103 and compared with a relatively high reference voltage 11, giving the advantage of high noise immunity. The voltage versus temperature characteristic for the voltage at the external output terminal 19 for temperature detection is the same as the one in the first embodiment.

[Third Embodiment]

Figure 4:
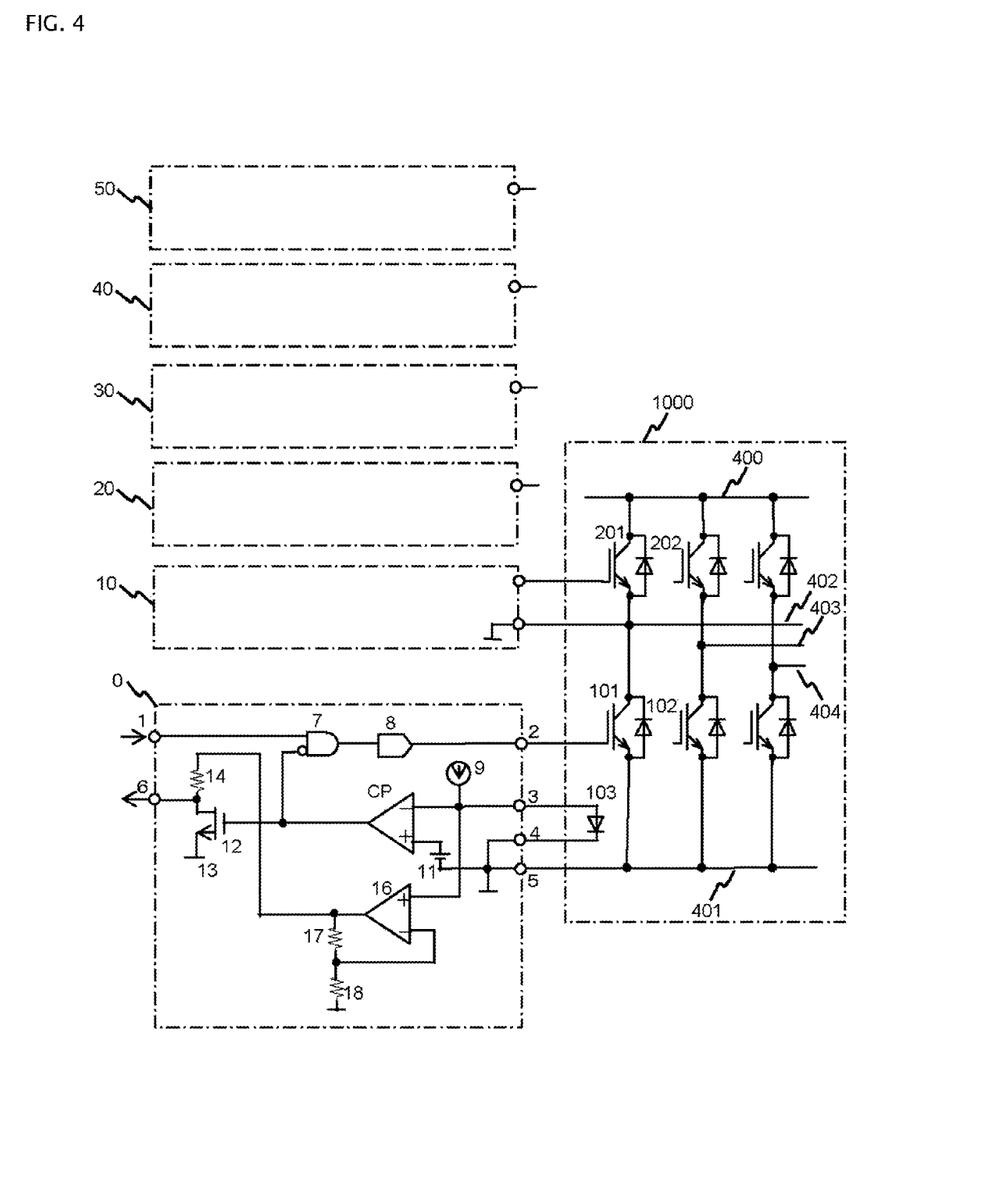
FIG. 4 is a circuit diagram showing a semiconductor device according to a third embodiment of the present invention.
Figure 5:
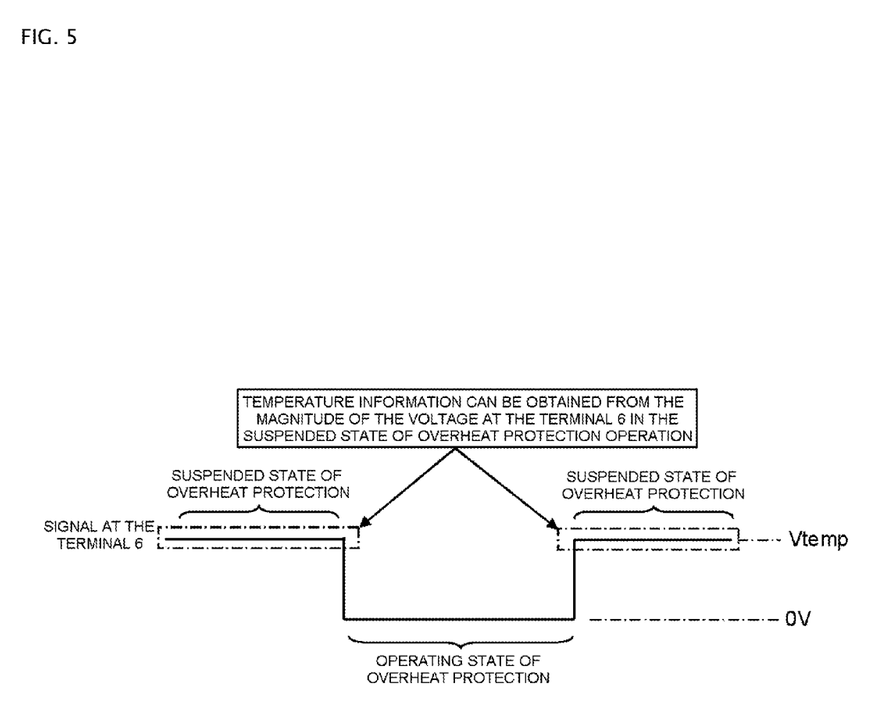
FIG. 5 shows a voltage signal at the temperature output terminal in the third embodiment of the present invention.

FIG. 4 is a circuit diagram of a semiconductor device according to a third embodiment of the invention. The device of the third embodiment differs from the device of the first embodiment in that while in the device of the first embodiment, the output terminal of the series regulator circuit composed of the amplifier 16 and the resistors 17 and 18 is connected to the external output terminal 19 and a resistor 14 that is connected to the drain terminal of the switching element 12 at one end thereof is connected to the reference power supply 15 at the other end thereof, in the device of the third embodiment on the other hand, the output terminal of the series regulator circuit is connected to the other end of the resistor 14 that is connected to the drain terminal of the switching element 12 at one end thereof. FIG. 5 shows an operation waveform delivered from the external output terminal 6 connected to the drain terminal of the switching element 12 in the device of the third embodiment. The voltage at the external output terminal 6 is the ground potential zero volts in operation of the overheat protection circuit, and the voltage is the output voltage of the series regulator circuit during suspended period of the overheat protection circuit, thus the temperature of the IGBT chip can be detected in the normal state.

[Fourth Embodiment]

Figure 6:
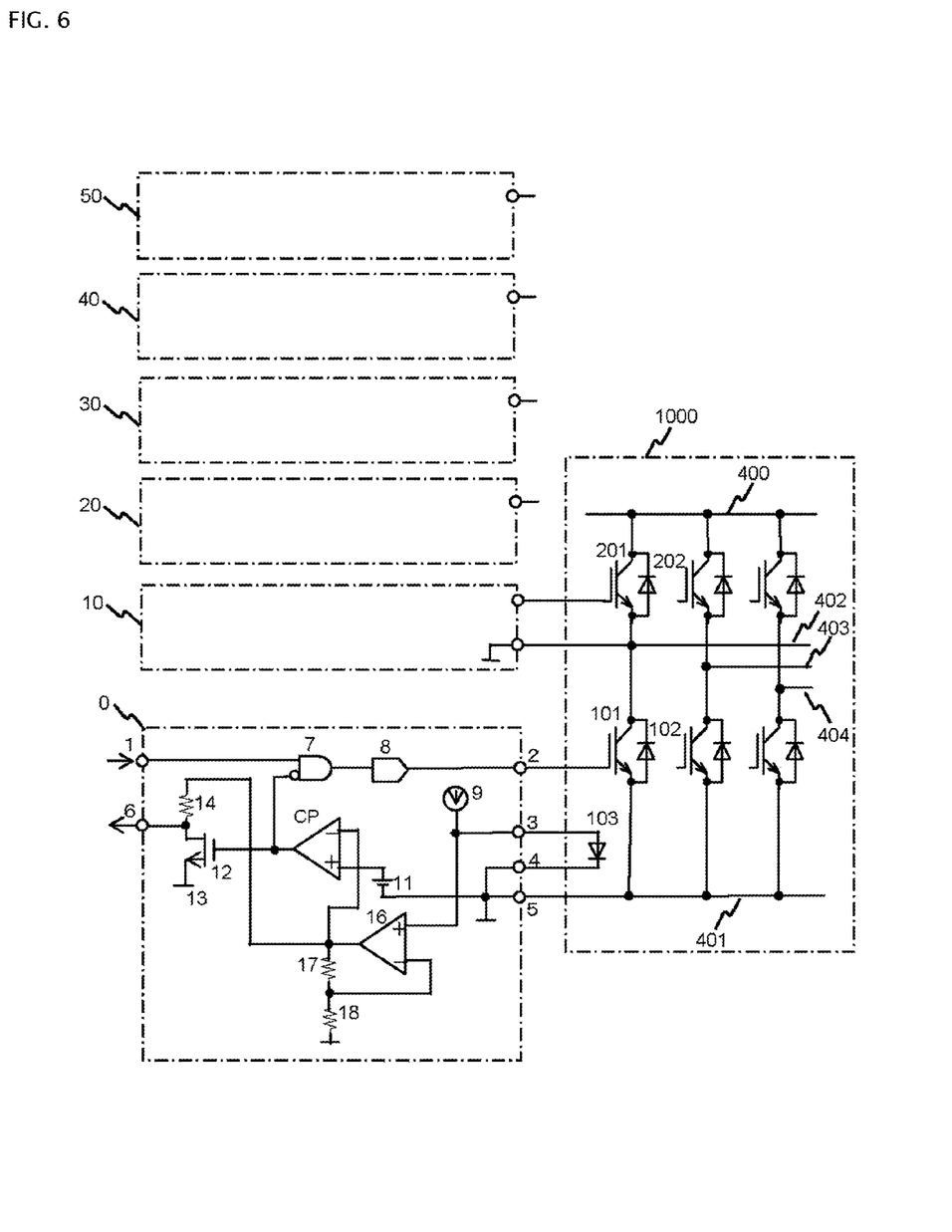
FIG. 6 is a circuit diagram showing a semiconductor device according to a fourth embodiment of the present invention.

FIG. 6 is a circuit diagram of a semiconductor device according to a fourth embodiment of the invention. The device of the fourth embodiment differs from the device of the third embodiment in that while the device of the third embodiment performs overheat protection by comparing directly the voltage across the temperature sensing diode 103 with the reference voltage 11 in the comparator CP, the device of the fourth embodiment performs overheat protection by comparing the output of the series regulator circuit composed of the amplifier 16 and the resistors 17 and 18 with the reference voltage 11 in the comparator CP. The output of the series regulator is a voltage obtained by amplifying the voltage across the temperature sensing diode 103 and compared with a relatively high reference voltage 11, giving the advantage of high noise immunity. The voltage versus temperature characteristic for the voltage at the external output terminal 6 for temperature detection is the same as the one in the third embodiment.

Although the devices of the first through fourth embodiments use an IGBT for the semiconductor switch, a MOSFET can also be used. While in the embodiments, the temperature sensing diode is mounted on the chip of the semiconductor switch, the diode can be disposed in close vicinity of the chip of the semiconductor switch.

The present invention proposes a technology to detect temperature of a semiconductor switch, which can be applied to all types of power conversion equipment composed of a semiconductor module in addition to the IPM described thus far.

DESCRIPTION OF SYMBOLS 0, 10, 20, 30, 40, 50: driver IC
1: input terminal of the driver IC 0
2: output terminal of the driver IC 0
3: a terminal of the driver IC 0 for detecting the voltage across a temperature sensing diode
4, 5: ground potential terminal of the driver IC 0
6: external output terminal of the driver IC 0 for detecting overheat protection operation
7: AND gate
8: pre-driver
9: current source
CP: comparator
16: amplifier
11, 15: reference voltage
12: switching element that can be an NMOS
13: ground of a control circuit
14, 17, 18: resistor
101, 201: IGBT
102, 202: diode
400: high voltage bus of the main circuit
401: low voltage bus of the main circuit
402, 403, 404: AC line
1000: main circuit

What is claimed is:

1. A semiconductor device for a power conversion circuit comprising:
    a semiconductor switch;
    a diode antiparallel connected to the semiconductor switch; and
    a temperature sensing diode that is disposed in a chip of the semiconductor switch; and
    a driver IC including:
        a current source that supplies constant current to the temperature sensing diode;
        an overheat protection circuit that turns the semiconductor switch OFF when a forward voltage drop of the temperature sensing diode reaches a predetermined value, the overheat protection circuit including a comparator; and
        a series regulator including an operational amplifier of which a non-inverting input terminal receives the forward voltage drop of the temperature sensing diode, and a first resistance and a second resistance connected to each other in series and provided between an output terminal of the operational amplifier and a ground, the second resistance being connected directly to the ground, the connecting point of the first resistance and the second resistance being directly connected to an inverting input terminal of the operational amplifier;
    wherein an output signal of the series regulator is delivered directly to an external output terminal for temperature detection of the semiconductor device to convert the temperature of the semiconductor switch into voltage so as to output the voltage from the semiconductor device for a power conversion circuit;
    wherein the series regulator and the external output terminal are distinct from the overheat protection circuit,
    wherein the output signal of the series regulator is not connected to the comparator of the overheat protection circuit, and
    wherein the output signal of the series regulator is output even in a state where the overheat protection circuit turns the semiconductor switch OFF.

2. The semiconductor device for a power conversion circuit according to claim 1, wherein the overheat protection circuit turns the semiconductor switch OFF when the output voltage of the series regulator reaches a predetermined value.

3. The semiconductor device for a power conversion circuit according to claim 2, wherein the semiconductor switch is an insulated gate type semiconductor element.

4. The semiconductor device for a power conversion circuit according to claim 1, wherein the semiconductor switch is an insulated gate type semiconductor element.

5. The semiconductor device for a power conversion circuit according to claim 1, wherein the connecting point of the first resistance and the second resistance is not connected to any other resistances.

6. A semiconductor device for a power conversion circuit comprising:
    a semiconductor switch;
    a diode antiparallel connected to the semiconductor switch;
    a temperature sensing diode that is disposed in a chip of the semiconductor switch; and a driver IC including:
- a current source that supplies constant current to the temperature sensing diode;
- an overheat protection circuit that turns the semiconductor switch OFF when a forward voltage drop of the temperature sensing diode reaches a predetermined value, the overheat protection circuit including a comparator; and
- a series regulator including an operational amplifier of which a non-inverting input terminal receives the forward voltage drop of the temperature sensing diode, and a first resistance and a second resistance connected to each other in series and provided between an output terminal of the operational amplifier and a ground, the second resistance being connected directly to the ground, the connecting point of the first resistance and the second resistance being directly connected to an inverting input terminal of the operational amplifier; and
- a switching circuit that turns ON with operation of the overheat protection circuit;

wherein an output signal of the series regulator is delivered to the switching circuit and the switching circuit delivers a ground potential of a power supply of the driver IC when the switching circuit is in an ON state and the switching circuit delivers the output voltage of the series regulator when the switching circuit is in an OFF state, directly to an external output terminal for temperature detection of the semiconductor device to convert the temperature of the semiconductor switch into voltage so as to output the voltage from the semiconductor device for a power conversion circuit;

wherein the series regulator and the external output terminal are distinct from the overheat protection circuit, wherein the output signal of the series regulator is not connected to the comparator of the overheat protection circuit, and wherein the output signal of the series regulator is output even in a state where the overheat protection circuit turns the semiconductor switch OFF.

7. The semiconductor device for a power conversion circuit according to claim 6, wherein the semiconductor switch is an insulated gate type semiconductor element.

8. The semiconductor device for a power conversion circuit according to claim 6, wherein the overheat protection circuit turns the semiconductor switch OFF when the output voltage of the series regulator reaches a predetermined value.

\* \* \* \* \*